(12) United States Patent
Renken et al.

(10) Patent No.: US 12,070,989 B2
(45) Date of Patent: Aug. 27, 2024

(54) ISOLATED EVAPORATOR COIL FOR A TRANSPORT CLIMATE CONTROL SYSTEM

(71) Applicant: THERMO KING LLC, Minneapolis, MN (US)

(72) Inventors: David J. Renken, Prior Lake, MN (US); Tony Spetz, Afton, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 18/152,434

(22) Filed: Jan. 10, 2023

(65) Prior Publication Data
US 2023/0158863 A1 May 25, 2023

(51) Int. Cl.
*B60H 1/32* (2006.01)
*B60H 1/00* (2006.01)
*F25B 49/00* (2006.01)

(52) U.S. Cl.
CPC ....... *B60H 1/3225* (2013.01); *B60H 1/00014* (2013.01); *F25B 49/005* (2013.01)

(58) Field of Classification Search
CPC ............ B60H 1/32215; B60H 1/00014; F25B 49/005; F25B 2339/02; F25B 2339/0242; F25B 2500/22; F25B 2500/221
See application file for complete search history.

(56) References Cited

U.S. PATENT DOCUMENTS

| 4,462,461 A | 7/1984 | Grant |
| 5,918,475 A * | 7/1999 | Sakakibara .......... B60H 1/3225 62/126 |
| 2004/0168448 A1 * | 9/2004 | Kadle ................... F25B 49/005 62/149 |
| 2016/0178229 A1 * | 6/2016 | Chen ....................... F24F 11/30 62/126 |
| 2017/0080780 A1 | 3/2017 | Commault et al. |
| 2020/0238791 A1 | 7/2020 | Senf, Jr. |
| 2021/0001689 A1 | 1/2021 | Kondrk et al. |
| 2021/0188046 A1 * | 6/2021 | Kondrk ............. B60H 1/00521 |

FOREIGN PATENT DOCUMENTS

| DE | 202014001225 | | 2/2014 |
| DE | 2020214001225 | * | 2/2014 |
| EP | 0962343 | | 12/1999 |
| EP | 2442055 | | 5/2019 |

(Continued)

OTHER PUBLICATIONS

English machine translation of DE202014001225U1 (Booi), published Feb. 21, 2014. (Year: 2014).*

(Continued)

*Primary Examiner* — Marc E Norman
(74) *Attorney, Agent, or Firm* — HSML P.C.

(57) ABSTRACT

Technologies described herein are directed to isolating or insulating at least portions of an evaporator coil within a climate control unit (CCU) of a TCCS so as to reduce or even eliminate adverse effects caused by a leaked working fluid. Such adverse effects may include a threat of ignition, asphyxiation of occupants, damage to cargo, and other harmful effects caused by emission of a noxious gas. A leak isolation structure is provided to isolate evaporator tubes of an evaporator coil from at least one of a plurality of turns of the evaporator coil.

6 Claims, 9 Drawing Sheets

(56) References Cited

FOREIGN PATENT DOCUMENTS

| JP | 10197186 | 7/1998 |
|---|---|---|
| JP | 2017-219297 | 12/2017 |
| WO | 2020/009776 | 1/2020 |
| WO | 2020/055633 | 3/2020 |
| WO | 2020/067654 | 4/2020 |
| WO | 2020/0236480 | 11/2020 |
| WO | 2021/046107 | 3/2021 |

OTHER PUBLICATIONS

Extended European Search Report, issued in the corresponding European patent application No. 21182909.8, dated Nov. 23, 2021, 7 pages.
Extended European Search Report, issued in the corresponding European patent application No. 21182909.8, dated Jun. 25, 2024, 4 pages.

* cited by examiner

ISOLATED EVAPORATOR COIL FOR A TRANSPORT CLIMATE CONTROL SYSTEM

FIELD

The embodiments disclosed herein relate substantially to a transport climate control system (TCCS). More particularly, the embodiments relate to isolating or insulating leaks from an evaporator coil of a climate control circuit for use in a TCCS.

BACKGROUND

A transport climate control system is generally used to control environmental condition(s) (e.g., temperature, humidity, air quality, and the like) within a climate controlled space of a transport unit (e.g., a truck, trailer, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, under the transport unit or on a front wall of the transport unit, etc.).

The transport climate control system can include a climate control circuit with a compressor, a condenser, an expansion valve, and an evaporator. A working fluid can include a refrigerant that can be compressed and expanded as it flows through the climate control circuit and can be used to heat and/or cool the particular space.

SUMMARY

The embodiments described herein are directed to isolating or insulating at least portions of an evaporator coil within a climate control unit (CCU) of a TCCS so as to reduce or even eliminate adverse effects caused by a leaked working fluid (e.g., leaked refrigerant). Such adverse effects may include a threat of ignition, asphyxiation of occupants, damage to cargo, and other harmful effects caused by emission of a noxious gas.

The embodiments described, recited, and suggested herein facilitate understanding of an evaporator coil within a CCU, which may include brazed points that are vulnerable to leakage of a refrigerant flowing therein.

In accordance with at least one embodiment, a climate-control unit (CCU) of a transport unit is provided. The CCU includes a condenser unit, an evaporator unit, and a leak isolation structure. The evaporator unit includes an evaporator coil. The evaporator coil includes a plurality of evaporator tubes and a plurality of turns. The evaporator coil traverses at least a portion of an interior of the evaporator unit. The leak isolation structure is configured to insulate at least one of the plurality of evaporator tubes from a leak at one of the plurality of turns of working fluid passing through the evaporator coil.

In some embodiments, the leak isolation structure is a detachable cap. The plurality of turns is disposed within the detachable cap. In some embodiments, a head plate with a turn side and a tube side is provided such that the plurality of turns is disposed on the turn side and the plurality of evaporator tubes are disposed on the tube side. In some embodiments, the detachable cap is attachable and sealed to the head plate such that the plurality of turns disposed within the detachable cap are isolated from the plurality of evaporator tubes. In some embodiments, the detachable cap is attached to the head plate with a pressure resistant sealant. In some embodiments, the detachable cap is configured to vent any leaked working fluid to atmosphere via a duct. In some embodiments, the detachable cap is comprised of sheet metal or plastic.

In some embodiments, the leak isolation structure is a sealed bulkhead that separates the condenser unit from the evaporator unit. The sealed bulkhead includes a condenser side and an evaporator side, and the plurality of turns is disposed on the condenser side and the plurality of evaporator tubes are disposed on the evaporator side. In some embodiments, the sealed bulkhead isolates the evaporator unit from a gas escaping from the evaporator coil on the condenser unit side of the bulkhead. In some embodiments, a head plate is provided with a turn side and a tube side such that the plurality of turns is disposed on the turn side and the plurality of evaporator tubes are disposed on the tube side. The sealed bulkhead surrounds and is sealed to a perimeter edge of the head plate such that the plurality of turns are isolated from the plurality of evaporator tubes. In some embodiments, the sealed bulkhead is attached to the head plate with a pressure resistant sealant. In some embodiments, a second head plate is provided with a second turn side and a second tube side. The plurality of evaporator tubes includes a first end and a second end with the plurality of turns provided at the first end. The evaporator coil includes a plurality of second turns provided at the second end. The plurality of second turns is disposed on the second turn side and the plurality of evaporator tubes are disposed on the second tube side. The sealed bulkhead surrounds and is sealed to a perimeter edge of the second head plate such that the plurality of second turns are isolated from the plurality of second evaporator tubes.

In some embodiments, the leak isolation structure is a sealed duct. The plurality of the evaporator tubes is disposed within the sealed duct and at least one of the plurality of turns is disposed outside of the sealed duct. In some embodiments, a head plate is provided with a turn side and a tube side such that the plurality of turns is disposed on the turn side and the plurality of evaporator tubes are disposed on the tube side. The sealed duct is attached to the head plate such that the plurality of evaporator tubes disposed within the sealed duct is isolated from the plurality of turns. In some embodiments, the sealed duct is attached to the head plate with a pressure resistant sealant.

DRAWINGS

References are made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

DETAILED DESCRIPTION

Embodiments disclosed and recited in this disclosure relate substantially to a transport climate control system (TCCS). More particularly, the embodiments relate to isolating or insulating leaks from an evaporator coil of a climate control circuit for use in a TCCS.

A CCU, in accordance with the embodiments described and recited herein, may be configured to create optimal air flow on both a condenser side, e.g., a side having condenser unit, and an evaporator side, e.g., a side having an evaporator unit. The front and rear sides may be divided by a bulkhead that provides structural support for various components of the CCU, such as an air filter, a fuel filter, an evaporator blower, condenser blowers, an evaporator coil, condenser coils, etc. The embodiments described and recited herein are directed towards isolating or insulating leaks at, e.g., critical joints, of an evaporator coil, thus eliminating the possibility of harmful refrigerants leaking into the rear side, i.e., evaporator unit, of the CCU.

In the following detailed description, reference is made to the accompanying drawings, which are included as a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as substantially described herein and illustrated in the drawings, may be arranged, substituted, combined, separated, and designed in a wide variety of different configurations, all of which are explicitly contemplated herein.

While the embodiments described below illustrate different embodiments of a transport climate control system, it will be appreciated that the isolated evaporated coil is not limited to the transport climate control system or a climate-control unit (CCU) of the transport climate-control system.

The embodiments disclosed and recited herein are directed towards insulating, isolating, and/or relocating evaporator coil joints into a space that is insulated, sealed, or repositioned into a space external to other components of the evaporator unit, a climate controlled space (e.g., cargo area), or any area that has a potential source of ignition so that any potential leak into the corresponding evaporator coil may be mitigated below a flammable concentration, away from a potential source of ignition.

Accordingly, the embodiments disclosed and recited herein are configured by taking into account portions of an evaporator coil that attach to different components of a climate control circuit to thereby isolate potential leak points of the evaporator coil from an evaporator space.

Further, in accordance with at least one embodiment, a shape of the evaporator coil may be reconfigured from a straight block to relocate the return bend end into the condenser side of a sealed bulkhead. That is, such configuration, which obviates a need for a duct, any potential leak point corresponding to the evaporator coil is isolated from other components of the evaporator unit, a climate controlled space (e.g., cargo area), or any area that has a potential source of ignition.

In accordance with another example embodiment, the return bend of the evaporator coil may be contained within a removable leak isolation structure (e.g., cover, cap, etc.) to isolate any potential leak joints. By this configuration, evaporator coil tubes of the evaporator may be disposed on the evaporator side of a bulkhead within the CCU, but any potential leak point, e.g., return vent and/or manifold, may be isolated, venting downward to atmosphere outside of the isolation structure, via a vent tube, hose, or duct, detachably provided for vent routing. The leak isolation structure (e.g., cover, cap, etc.) may be made of sheet metal or plastic and fits over a top of the return vents. The leak isolation structure (e.g., cover, cap, etc.) may further connect to a head plate, and may be vented to atmosphere via a hose, tube, or duct. Potential leak points may be isolated due to the absence of ignition sources within the covered area.

In accordance with still another example embodiment, air from the condenser side of a bulkhead within a CCU may be ducted into an isolated evaporator return bend area, thus reducing any potential buildup of refrigerant gas leaking from the evaporator coil. That is, such configuration can include an entirety of the evaporator coil being within the condenser air stream, and the evaporator coil is exposed into the evaporator side of the bulkhead within the CCU with a corresponding inlet and outlet being exposed to facilitate air exchange.

In accordance with at least one other example embodiment, an end of the evaporator coil may be coated with a pressure resistant sealant.

Figure 1:
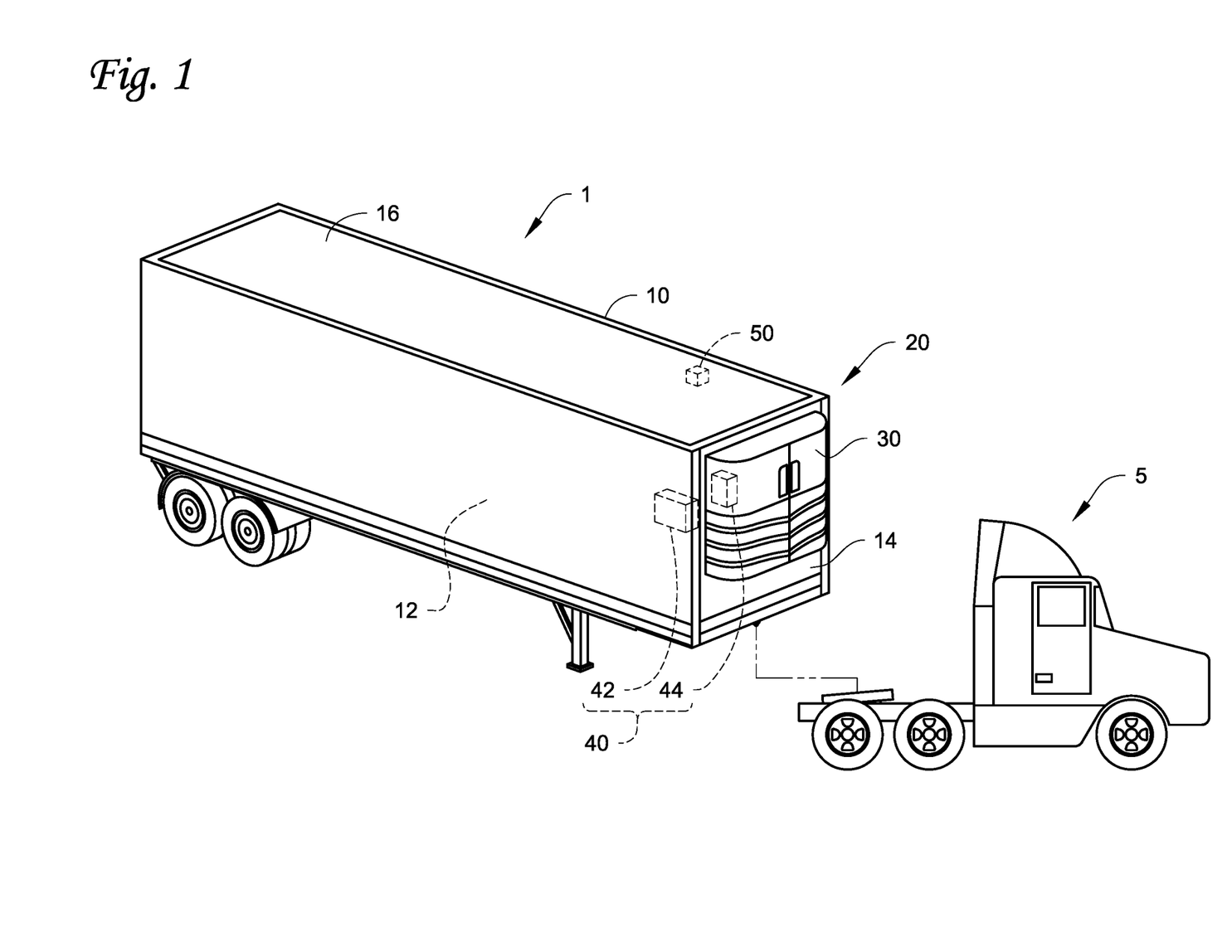
FIG. 1 illustrates a transport climate control system for a transport unit that is attached to a vehicle, in accordance with at least one embodiment described and/or recited herein.

FIG. 1 illustrates a TCCS 20 for a climate-controlled transport unit 1 that is attached to a tractor 5, in accordance with at least one embodiment described and/or recited herein. The climate-controlled transport unit 1 includes a transport unit 10 and the corresponding TCCS 20.

The transport unit 10 may be attached to tractor 5 that is configured to tow the transport unit 10, although transport unit 10 may alternatively be parked and detached from tractor 5. Note that the embodiments described herein are not limited to tractor and trailer units, but may apply to any type of transport unit such as e.g., a truck, trailer, a container (such as a container on a flat car, an intermodal container, etc.), a box car, a semi-tractor, a bus, or other similar transport unit.

The TCCS 20 includes a climate control unit (CCU) 30 that provides environmental control, e.g., temperature, humidity, air quality, etc., within a climate-controlled space 12 of transport unit 10.

The CCU 30 may provide conditioned air into the climate-controlled space 12, i.e., internal space, of the transport unit 10 to provide a desired conditioned environment for goods within. The desired conditioned environment for the climate-controlled space 12 may have one or more desired environmental conditions, e.g., temperature, humidity, air quality, etc., of the climate-controlled space 12. For example, the CCU 30 may provide cooled air to the climate-controlled space 12 when perishable goods are within the transport unit 10; additionally or alternatively, the CCU 30 may remove humidity from the air within the climate-controlled space 12 depending on needs of the goods within the transport unit 10, e.g., when electronics are within the transport unit 10.

The CCU 30 may be disposed on a front wall 14 of the transport unit 10; that is, on a side of the transport unit facing the forward direction as when climate-controlled transport unit 1 that is attached to a tractor 5. In one or more alternative embodiments, the CCU 30 may be disposed, for example, on a roof 14 or another wall of the transport unit 10.

The climate-controlled transport unit 1 may include at least one of a battery (not shown) or an engine (not shown) as a power source.

The TCCS 20 may be a hybrid power system that uses a combination of battery power and engine power or an electric power system that does not include or rely upon an engine of the TCCS 20 or the tractor 5 for power. The TCCS 20 may also include a programmable climate-controller 40 and one or more sensors 50. The one or more sensors 50 may be configured to measure one or more parameters of the climate-controlled transport unit 1, e.g., an ambient temperature and/or ambient humidity outside of the transport unit 10, a compressor suction pressure, a compressor discharge pressure, a temperature of air supplied into the climate-controlled space 12 by the CCU 30, a temperature of air returning from the climate-controlled space 12 to the CCU 30, humidity within the climate-controlled space 154, etc., and to communicate parameter data to the climate-controller 40. The climate-controller 40 may be configured to control operation of the TCCS 20, including components of the climate-control circuit. The climate-controller 40 may be a single integrated control unit 42 or a control unit formed by a distributed network of climate-controller elements 42, 44. The number of distributed control elements in a given network may depend upon the particular application of the principles described herein.

With regard to at least programmable climate-controller 40 and one or more sensors 50, dashed lines are shown in FIG. 1 to illustrate features that would not otherwise be visible in the view shown.

Figure 2:
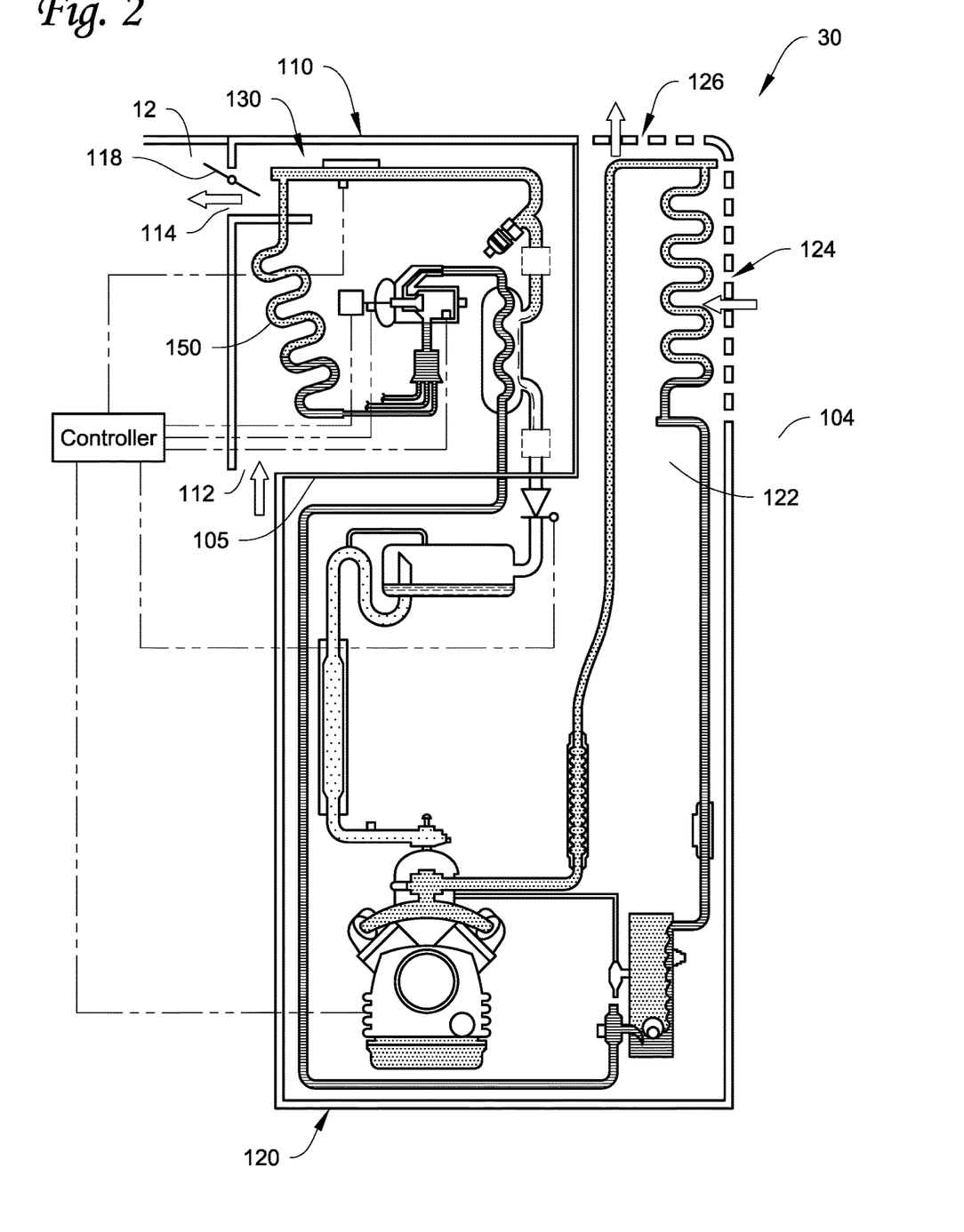
FIG. 2 is a schematic diagram of an embodiment of a climate control unit for a transport climate controlled system, in accordance with at least one non-limiting example embodiment described and/or recited herein.

FIG. 2 is a schematic diagram of an embodiment of a CCU 30 for a TCCS (e.g., the TCCS 20 shown in FIG. 1), in accordance with at least one non-limiting example embodiment described and/or recited herein.

The CCU 30 is utilized in a transport climate control system to condition a climate-controlled space 12. The CCU 30 includes a climate control circuit 130 that is configured and utilized to control one or more environmental conditions, e.g., temperature, humidity, air quality, etc., of the climate-controlled space 12. The CCU 30 includes, at least, an evaporator unit 110 and a condenser unit 120.

The evaporator unit 110 may include an evaporator air inlet 112, which alternatively be referred to as an air return inlet, and an evaporator air outlet 114. Air passes through the evaporator unit 110 by entering through the evaporator air inlet 112 and exiting through the evaporator air outlet 114. After air from the climate-controlled space 12 enters the evaporator unit 110 through the evaporator air inlet 112, the air is conditioned within the evaporator unit 110, i.e., heated or cooled; and the conditioned air is discharged from the evaporator unit 110 through the evaporator air outlet 114. In some embodiments, the evaporator unit 110 can include one or more evaporator blowers (not shown) that discharges conditioned air through the evaporator air outlet 114 and retrieves air from the climate-controlled space 12 through the evaporator air inlet 112. The conditioned air flows from the evaporator air outlet 114 to the climate-controlled space 12 to condition the climate-controlled space 12.

The condenser unit 120 may include an ambient air inlet 124 and an ambient air outlet 126. Ambient air from the external environment 104, e.g., ambient air from outside the climate-controlled transport unit 1, flows through the condenser unit 120 by entering through the ambient air inlet 124 and exiting through the ambient air outlet 126. In some embodiments, the condenser unit 120 can include one or more condenser fans (not shown) that push air out of the condenser unit 120 through the ambient air outlet 126.

Evaporator unit 110 may include a damper 118 that regulates the flow rate of the conditioned air from the condenser unit 120. It will be appreciated that the evaporator unit 110 and the condenser unit 120, in various embodiments, may each include one or more blower(s), fan(s) and/or damper(s) to control the flow of respective air therethrough.

The CCU 30 may further include a bulkhead 105 that separates an internal volume 122 of the evaporator unit 110 from an internal volume 122 of the condenser unit 120. Accordingly, air and/or leaked gaseous working fluid within the condenser unit 120 generally does not flow into the evaporator unit 110 and therefore does not flow into the conditioned space climate-controlled space 12.

The climate-control circuit 130 may extend through the bulkhead 105. Pipes, hoses, etc., of the climate-control circuit 130 extend through the bulkhead 105 to direct the working fluid between the components of climate-control unit 130 located in the evaporator unit 110 and the components of the component of the climate-control unit 130 located in the condenser unit 120.

Figure 3:
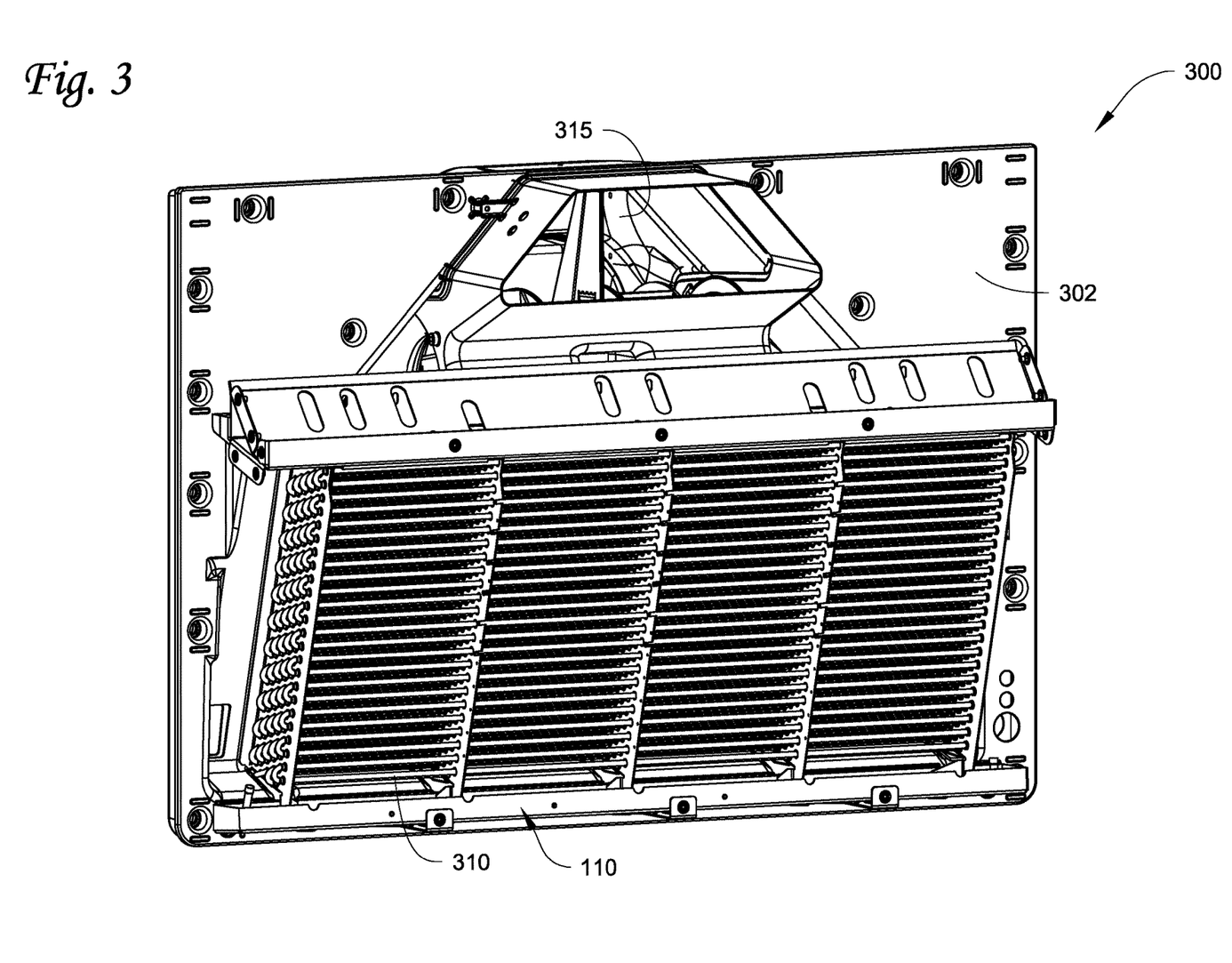
FIG. 3 illustrates a perspective view of an inner side of a bulkhead with an evaporator mounted on an inside surface of the bulkhead, in accordance with at least one non-limiting example embodiment described and/or recited herein.

FIG. 3 illustrates a perspective view of an inner side of a bulkhead 302 with an evaporator 110 mounted on an inside surface of the bulkhead 302, in accordance with at least one non-limiting example embodiment described and/or recited herein.

In accordance with at least one embodiment, evaporator unit 110 is disposed on the inner side of the bulkhead 302, and a condenser unit (not shown in FIG. 3) is disposed on the outside of the bulkhead 302. Evaporator coil 310 receives air from the conditioned space, as blown by an evaporator blower (not shown). A warm air flow enters through the bulkhead 302 where the two-phase refrigerant absorbs heat from air. The refrigerant generally leaves the evaporator unit 110 in a heated condition and is routed back to the compressors unit 40 for recycling. Cooled air exiting the air outlet opening is directed back into the conditioned space, where it will remove heat from the cargo and maintain the cargo at the desired temperature.

Accordingly, the non-limiting embodiments of evaporator coil 310 described and recited herein are designed and/or configured to reduce or even eliminate the risk of leaks of refrigerant therefrom, particularly as refrigerants having flammable and/or toxic properties are utilized.

Evaporator coils, including those made of copper tubing, aluminum, or other alloy with hairpin turns, have multiple brazed joints, which are vulnerable to cracks and/or other forms of fissures that could leak refrigerant out of the evaporator coil and exposing areas of the CCU and/or climate controlled space to fumes that may be flammable or toxic. Thus, the non-limiting embodiments described and recited herein have potential leak points, e.g., return vents, displaced from the evaporator space and/or climate controlled space into the condenser area.

Figure 4A:
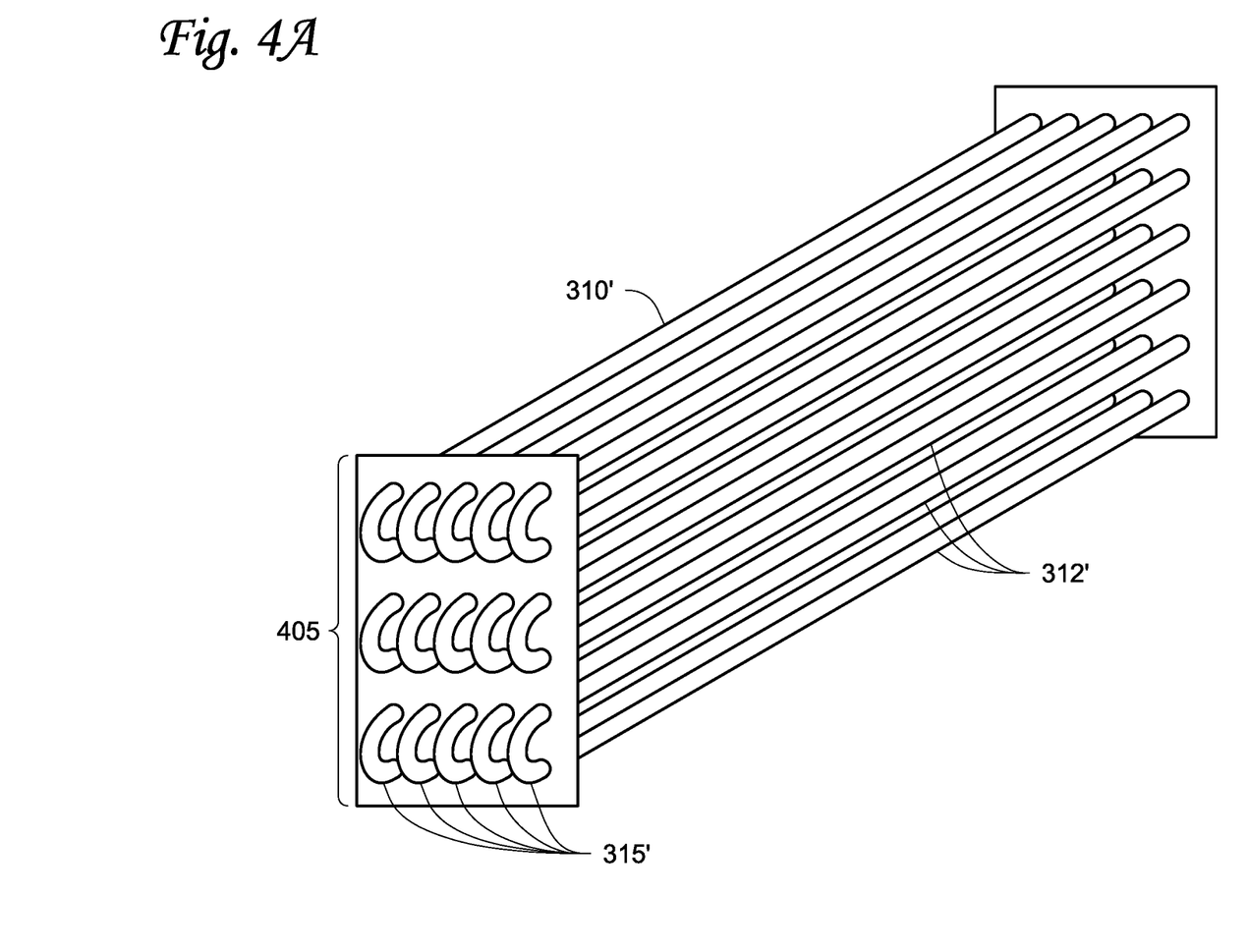
FIG. 4A illustrates an evaporator coil, in accordance with at least one non-limiting example embodiment described and/or recited herein.

FIG. 4A illustrates an evaporator coil 310', in accordance with at least one non-limiting example embodiment described and/or recited herein.

Figure 5:
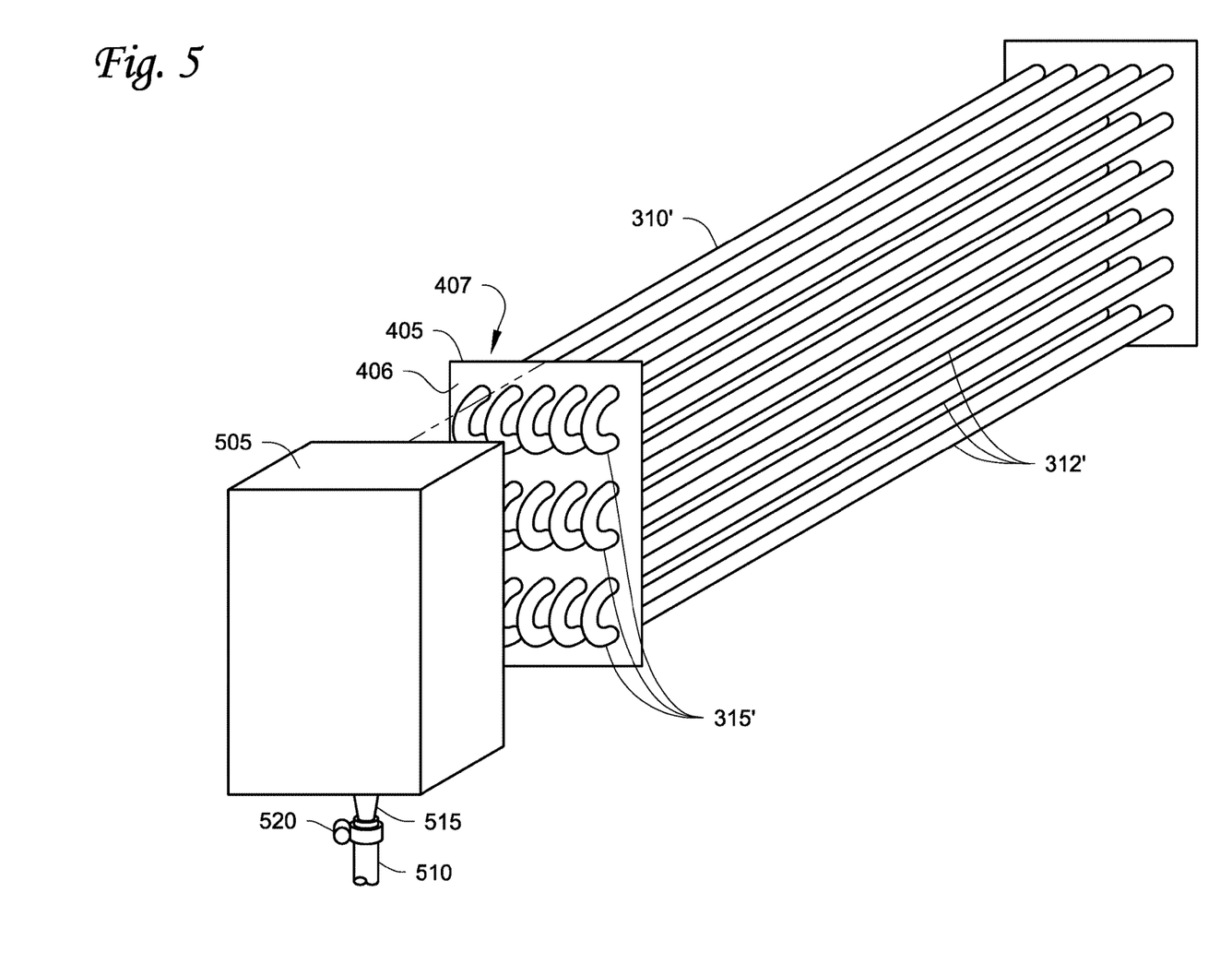
FIG. 5 illustrates a leak isolation structure shown as a lid-type covering for at least a portion of an evaporator coil, in accordance with at least one non-limiting example embodiment described and/or recited herein.

With reference to FIGS. 2, 3 and 4A evaporator 110 may include evaporator coil 310' that is generally straight and made of a plurality of evaporator tubes 312' (e.g., tubing of copper, aluminum, or other alloy with a plurality of turns 315' at head plate 405. The plurality of turns 315' is disposed on a turn side 406 of the head plate 405 and the plurality of evaporator tubes 312' is provided on a tube side 407 of the head plate 405. Each of the turns 315' allows a working fluid (including refrigerant) from one of the plurality of evaporator tubes 312' to travel to another of the plurality of evaporator tubes 312'. Each of the turns 315' can be about 180° hairpin turns. The turns 315,' which may be regarded as brazed return ends at head plate 405, may be formed by a brazed joint, which may be vulnerable to cracks and/or other forms of fissures that could leak refrigerant out of the evaporator coil 310', exposing areas of the CCU and/or climate controlled space to fumes that may be flammable or toxic. It is noted that turns 315' at the opposing head plate in FIG. 5 may be configured as a continuous hairpin radius, and may or may not be subject to a covering as shown in FIG. 5. The non-limiting example embodiment of evaporator coil 310' will be referenced below.

Figure 4B:
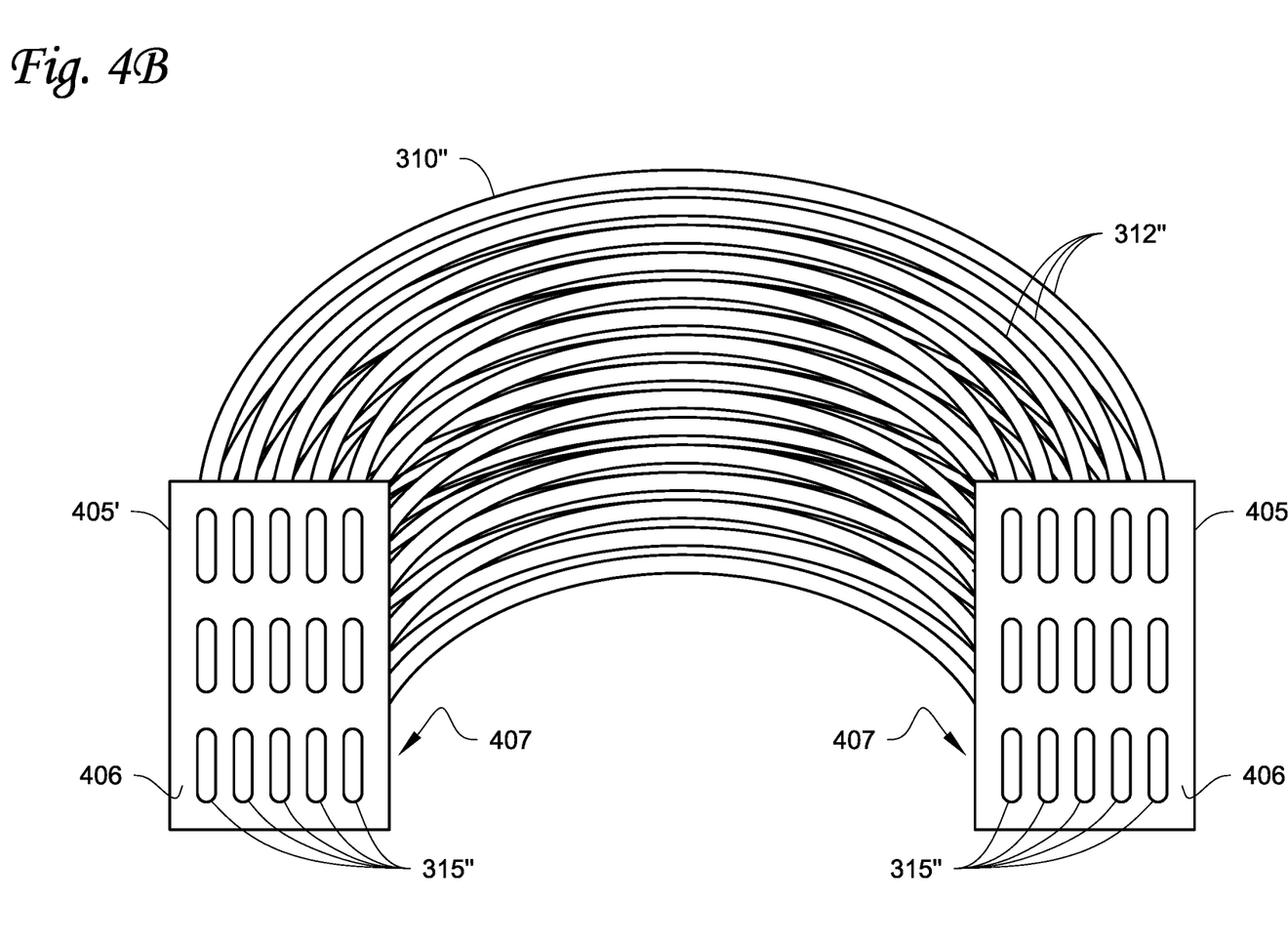
FIG. 4B illustrates another evaporator coil, in accordance with at least one non-limiting example embodiment described and/or recited herein.

FIG. 4B illustrates another evaporator coil 310" that is generally curved, in accordance with at least one non-limiting example embodiment described and/or recited herein.

With reference to FIGS. 2 and 3, evaporator 110 may include evaporator coil 310" which may also be made of a plurality of evaporator tubes 312" (e.g., curved copper tubing, aluminum, or other alloy with a plurality of turns 315" at head plate 405' The plurality of turns 315" is disposed on a turn side 406 of the head plate 405 and the plurality of evaporator tubes 312" is provided on a tube side 407 of the head plate 405. Each of the turns 315" allows a working fluid (including refrigerant) from one of the plurality of evaporator tubes 312" to travel to another of the plurality of evaporator tubes 312". Each of the hairpin turns 315" can be about 180° hairpin turns. The turns 315" can be formed by a brazed joint, which can be vulnerable to cracks and/or other forms of fissures that could leak refrigerant out of the evaporator coil 310", exposing areas of the CCU and/or climate controlled space to fumes that may be flammable or toxic. The non-limiting example embodiment of evaporator coil 310" will also be referenced below.

FIG. 5 illustrates a leak isolation structure shown as a lid-type covering for at least a portion of an evaporator coil, in accordance with at least one non-limiting example embodiment described and/or recited herein.

Accordingly, CCU 30 (FIG. 2) of transport unit 10 may include, at least, condenser unit 120, evaporator unit 110, and bulkhead 302 therebetween. Evaporator unit 110 may include evaporator coil 310' (FIG. 4A) that traverses at least a portion of an interior of condenser unit 120 and at least a portion of an interior of evaporator unit 110. In at least some alternative embodiments, the entirety of evaporator coil 310' may be contained within evaporator unit 110.

As shown in FIG. 5, evaporator coil 310' may include cover 505 to cover the turns 315' and thereby insulate at least portions of evaporator unit 110, including portions of evaporator coil 310' such as the plurality of evaporator tubes 312', from leaks. That is, at least one of the turns 315' can be disposed within the cover 505. Thus, whether evaporator coil 310' traverses a portion of an interior of condenser unit 120, as well as a portion of an interior of evaporator unit 110, or whether evaporator coil 310' is contained within evaporator unit 110, cover 505 may be a detachable cap that serves to isolate at least one turn 315' in evaporator coil 310' by being connected to head plate 405, which may alternatively be referenced as an end panel, in such a manner as to prevent gas, refrigerant, or air within from escaping. A pressure resistant sealant may be applied around the outer edges of each portion of evaporator coil 310' that engages with a planar portion of head plate 405 to insulate the interior of evaporator unit 110 from any refrigerant that may leak from any turn 315' of evaporator coil 310'. Lid 505 may be detachable to permit for, e.g., adjustments to an adjustment valve (not shown) or to perform a safety check on a lead.

In at least some alternative embodiments, cover 505 may be hermitically sealed with a pressure resistant sealant to evaporator 110 at head plate 405. Further, cover 505 may be made of sheet metal or plastic. Further still, whether detachable or temporarily sealed, cover 505 may be configured to vent to atmosphere, via a duct, hose(s), tube(s), etc. In accordance with at least one example embodiment, cover 505 may be fitted with hose 510 and barbed fitting 515, coupled by clamp 520, to vent air or gas from within cover 505 to atmosphere.

By the example embodiment of FIG. 5, upon the occurrence of a working fluid leak at any of the turns 315' in evaporator coil 310', by isolating the leaked working fluid between head plate 405 and lid 505, potential sources of ignition can be isolated and/or eliminated via host 510.

Figure 6:
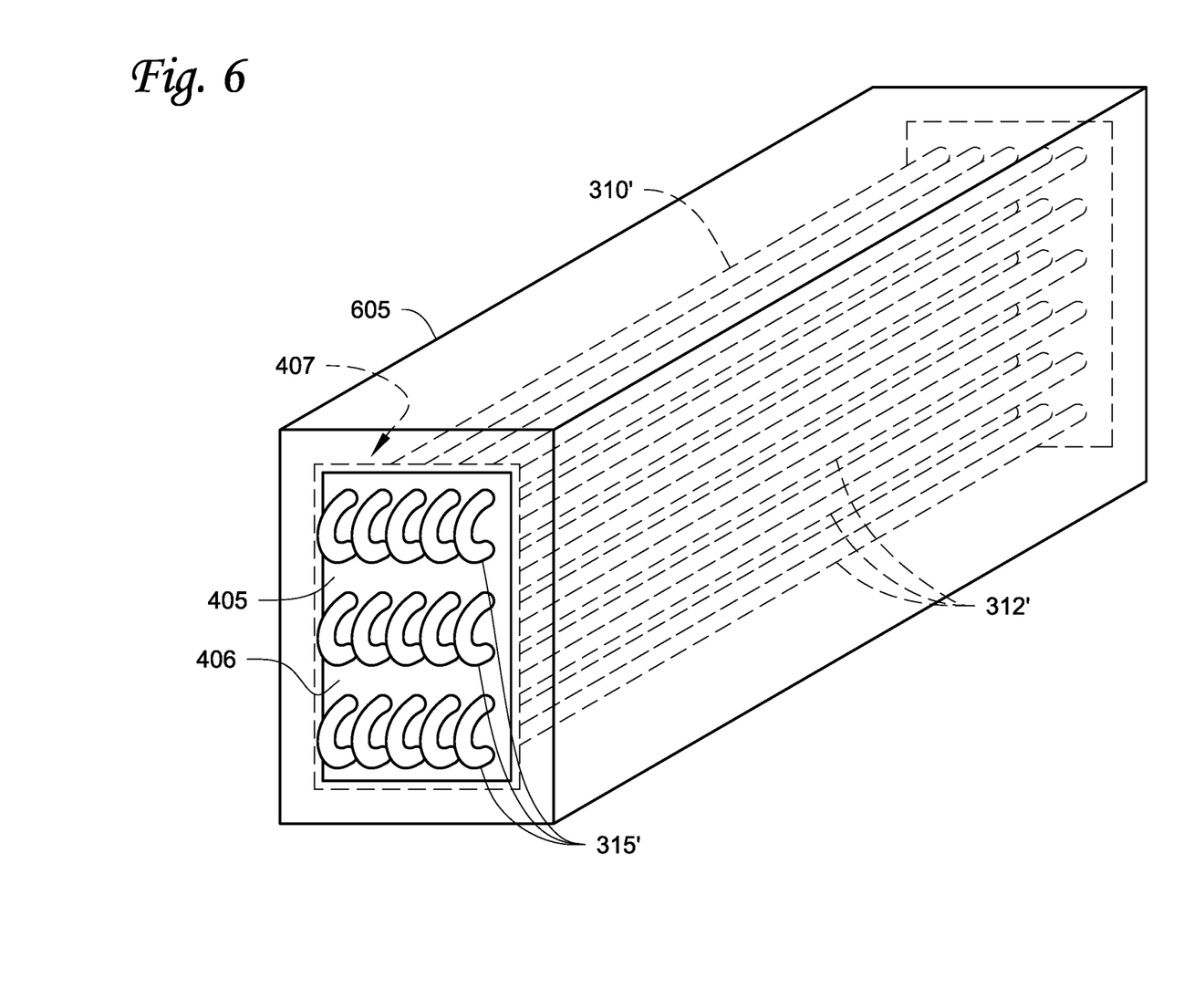
FIG. 6 illustrates a leak isolation structure shown as a duct-type covering for at least a portion of an evaporator coil, in accordance with at least one non-limiting example embodiment described and/or recited herein.

FIG. 6 illustrates a leak isolation structure shown as a duct-type covering for at least a portion of an evaporator coil, in accordance with at least one non-limiting example embodiment described and/or recited herein.

As set forth above, with regard to the description of FIG. 5, CCU 30 (FIG. 2) of transport unit 10 may include, at least, condenser unit 120, evaporator unit 110, and bulkhead 302 therebetween. Evaporator unit 110 may include evaporator coil 310' that traverses at least a portion of an interior of condenser unit 120 and at least a portion of an interior of evaporator unit 110. In at least some alternative embodiments, the entirety of evaporator coil 310' may be contained within evaporator unit 110.

As shown in FIG. 6, evaporator coil 310' may be substantially entirely (including the plurality of evaporator tubes 312') covered by encasement or duct 605 to isolate from potential leak points of evaporator coil 310' (e.g., the turns 315'). Thus, whether evaporator coil 310' traverses a portion of an interior of condenser unit 120, as well as a portion of an interior of evaporator unit 110, or whether evaporator coil 310' is contained within evaporator unit 110, encasement or duct 605 may ensure that, in the event of a working fluid leak from evaporator coil 310' (particularly at the turns 315'), there is no leakage out of the evaporator coil 310' that can expose areas of the CCU and/or climate controlled space to fumes that may be flammable or toxic.

That is, encasement or duct 605 covering the entirety of evaporator coil 310' may be entirely within the airstream of condenser unit 120 but for the brazed turns 315' at head plate 405, which may be exposed to evaporator 405 to thereby facilitate air exchange. Accordingly, at least some of the turns 315' of evaporator coil 310' may be configured to be external of evaporator unit 110, although an inlet and an outlet of evaporator coil 310' are exposed to evaporator unit 110. A pressure resistant sealant may be applied around all outer edges of each portion of duct 605 to evaporator unit 110 but for the turns 315' at head plate 405, thus preventing any leaked working fluid from entering into the duct 605.

Figure 7A:
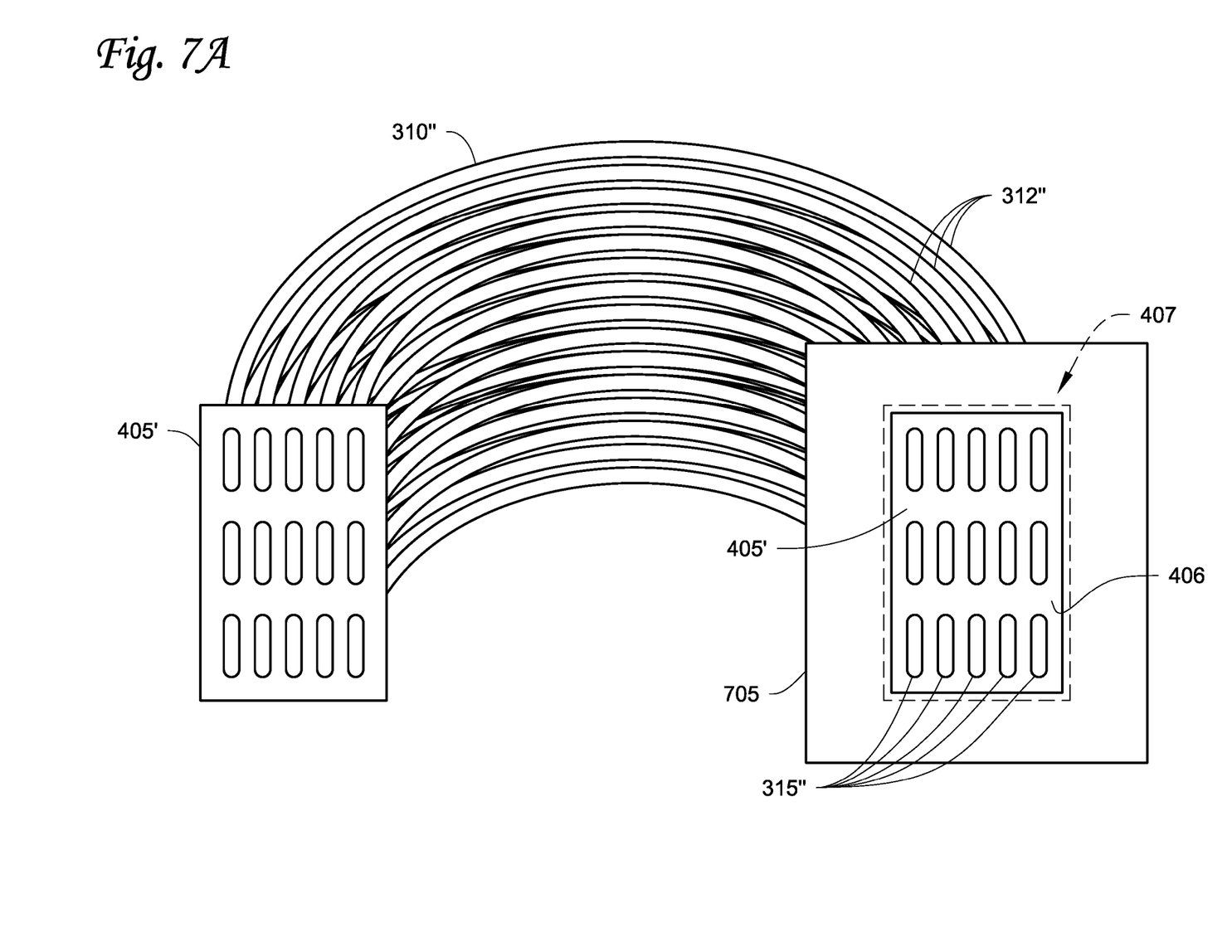
FIG. 7A illustrates a leak isolation structure shown as a bulkhead that is at least partially sealed relative to an evaporator coil, in accordance with at least one non-limiting example embodiment described and/or recited herein.

FIG. 7A illustrates a leak isolation structure shown as a bulkhead that is at least partially sealed relative to evaporator coil 310", in accordance with at least one non-limiting example embodiment described and/or recited herein.

Accordingly, CCU 30 (FIG. 2) of transport unit 10 may include, at least, condenser unit 120, evaporator unit 110, and bulkhead 302 therebetween. Evaporator unit 110 may include evaporator coil 310" (FIG. 4B) that traverses at least a portion of an interior of condenser unit 120 and at least a portion of an interior of evaporator unit 110. In at least some alternative embodiments, the entirety of evaporator coil 310' may be contained within evaporator unit 110.

As shown in FIG. 7A, the shape of evaporator coil 310" (FIG. 4B) is no longer a straight tube, but is rather turned about 180°, or substantially thereof. The curved shape of the evaporator coil 310" can relocate the turns 315" on at least one end of evaporator coil 310" into condenser area 120 at head plate 705, which may be aligned with bulkhead 302. Not only may a pressure resistant sealant be applied around the outer edges of each portion of evaporator coil 310" that engages with a planar portion of head plate 405' to insulate the interior of evaporator unit 110 from any refrigerant that may leak from a brazed joint end on any turns 315" of evaporator coil 310"; but, for the same purpose, such pressure resistant sealant may also be applied at the periphery of head plate 705 that engages with bulkhead 302.

Figure 7B:
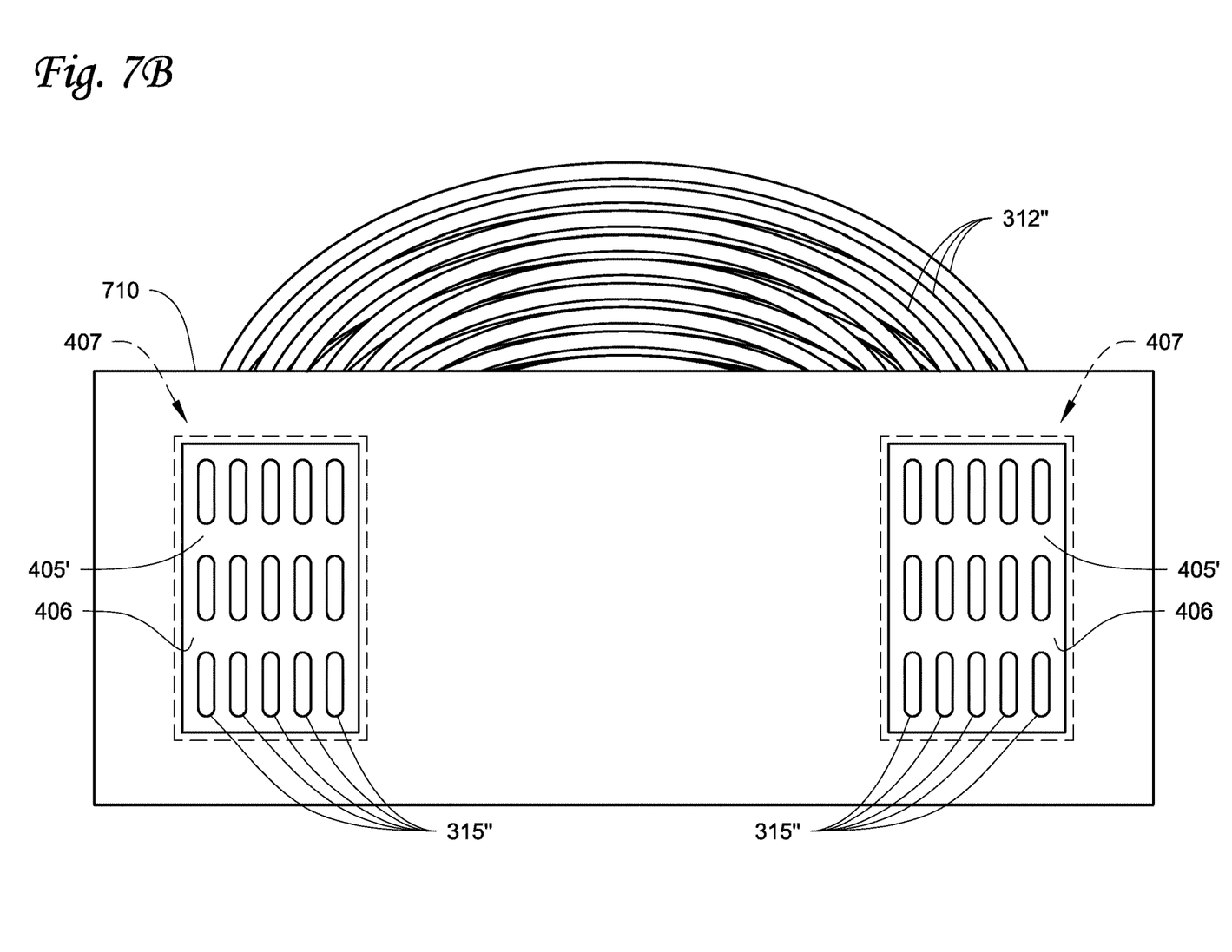
FIG. 7B illustrates a leak isolation structure shown as a bulkhead that is sealed relative to opposing ends of an evaporator coil, in accordance with at least one non-limiting example embodiment described and/or recited herein.

FIG. 7B illustrates a leak isolation structure shown a bulkhead that is sealed relative to opposing ends of evaporator coil 310", in accordance with at least one non-limiting example embodiment described and/or recited herein.

Accordingly, CCU 30 (FIG. 2) of transport unit 10 may include, at least, condenser unit 120, evaporator unit 110, and bulkhead 302 therebetween. Evaporator unit 110 may include evaporator coil 310" (FIG. 4B) that traverses at least a portion of an interior of condenser unit 120 and at least a portion of an interior of evaporator unit 110. In at least some alternative embodiments, the entirety of evaporator coil 310' may be contained within evaporator unit 110.

As shown in FIG. 7B, the shape of evaporator coil 310" (FIG. 4B) is no longer a straight tube, but is rather turned about 180°, or substantially thereof. The curved shape of the evaporator coil 310" can relocate the turns 315" on both ends of evaporator coil 310" into condenser area 120 at head plate 710, which may be aligned with bulkhead 302.

Accordingly, the turns 315" may be relocated or isolated into a space that is sealed or relocated to a ventilated space outside of the rest of the evaporator coil 310" (e.g., the plurality of evaporator tubes 312"), so that any potential leak may be mitigated below the flammable concentration away from potential sources of ignition.

Aspects

It is to be appreciated that any of the following aspects may be combined:

Aspect 1. A climate-control unit (CCU) of a transport unit, comprising:
a condenser unit;
an evaporator unit that includes an evaporator coil, wherein the evaporator coil includes a plurality of evaporator tubes and a plurality of turns, and wherein the evaporator coil traverses at least a portion of an interior of the evaporator unit; and a leak isolation structure configured to insulate at least one of the plurality of evaporator tubes from a leak at one of the plurality of turns of working fluid passing through the evaporator coil.

Aspect 2. The CCU of Aspect 1, wherein each of the plurality of turns allows a working fluid from one of the plurality of evaporator tubes to travel to another of the plurality of evaporator tubes.

Aspect 3. The CCU of either of Aspects 1 or 2, wherein the leak isolation structure is a detachable cap, and wherein the plurality of turns is disposed within the detachable cap.

Aspect 4. The CCU of Aspect 3, further comprising a head plate with a turn side and a tube side, wherein the plurality of turns is disposed on the turn side and the plurality of evaporator tubes are disposed on the tube side, wherein the detachable cap is attachable and sealed to the head plate such that the plurality of turns disposed within the detachable cap are isolated from the plurality of evaporator tubes.

Aspect 5. The CCU of Aspect 4, wherein the detachable cap is attached to the head plate with a pressure resistant sealant.

Aspect 6. The CCU of any of Aspects 3-5, wherein the detachable cap is configured to vent any leaked working fluid to atmosphere via a duct.

Aspect 7. The CCU of any of Aspects 3-6, wherein the detachable cap is comprised of sheet metal or plastic.

Aspect 8. The CCU of either one of Aspects 1 and 2, wherein the leak isolation structure is a sealed bulkhead that separates the condenser unit from the evaporator unit, wherein the sealed bulkhead includes a condenser side and an evaporator side, and wherein the plurality of turns is disposed on the condenser side and the plurality of evaporator tubes are disposed on the evaporator side.

Aspect 9. The CCU of Aspect 8, wherein the sealed bulkhead isolates the evaporator unit from a gas escaping from the evaporator coil on the condenser unit side of the bulkhead.

Aspect 10. The CCU of either of Aspects 8 or 9, further comprising a head plate with a turn side and a tube side, wherein the plurality of turns is disposed on the turn side and the plurality of evaporator tubes are disposed on the tube side, wherein the sealed bulkhead surrounds and is sealed to a perimeter edge of the head plate such that the plurality of turns are isolated from the plurality of evaporator tubes.

Aspect 11. The CCU of Aspect 10, wherein the sealed bulkhead is attached to the head plate with a pressure resistant sealant.

Aspect 12. The CCU of either of Aspect 10 or 11, further comprising a second head plate with a second turn side and a second tube side, wherein the plurality of evaporator tubes includes a first end and a second end with the plurality of turns provided at the first end, wherein the evaporator coil includes a plurality of second turns provided at the second end, wherein the plurality of second turns is disposed on the second turn side and the plurality of evaporator tubes are disposed on the second tube side, wherein the sealed bulkhead surrounds and is sealed to a perimeter edge of the second head plate such that the plurality of second turns are isolated from the plurality of second evaporator tubes.

Aspect 13. The CCU of either one of Aspects 1 and 2, wherein the leak isolation structure is a sealed duct, wherein the plurality of the evaporator tubes is disposed within the sealed duct and at least one of the plurality of turns is disposed outside of the sealed duct.

Aspect 14. The CCU of Aspect 13, further comprising a head plate with a turn side and a tube side, wherein the plurality of turns is disposed on the turn side and the plurality of evaporator tubes are disposed on the tube side, wherein the sealed duct is attached to the head plate such that the plurality of evaporator tubes disposed within the sealed duct is isolated from the plurality of turns.

Aspect 15. The CCU of Aspect 14, wherein the sealed duct is attached to the head plate with a pressure resistant sealant.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A climate-control unit (CCU) of a transport unit, comprising:
   a condenser unit;
   an evaporator unit that includes an evaporator coil,
      wherein the evaporator coil includes a plurality of evaporator tubes and a plurality of turns, and
      wherein the evaporator coil traverses at least a portion of an interior of the evaporator unit; and
   a leak isolation structure configured to insulate at least one of the plurality of evaporator tubes from a leak at one of the plurality of turns of working fluid passing through the evaporator coil,
      wherein the leak isolation structure is sealed to isolate the plurality of turns from the plurality of evaporator tubes,
      wherein the leak isolation structure is a detachable cap, and
      wherein the plurality of turns is disposed within the detachable cap.

2. The CCU of claim 1, wherein each of the plurality of turns allows a working fluid from one of the plurality of evaporator tubes to travel to another of the plurality of evaporator tubes.

3. The CCU of claim 1, further comprising:
   a head plate with a turn side and a tube side,
   wherein the plurality of turns is disposed on the turn side and the plurality of evaporator tubes are disposed on the tube side,
   wherein the detachable cap is attachable and sealed to the head plate such that the plurality of turns disposed within the detachable cap are isolated from the plurality of evaporator tubes.

4. The CCU of claim 3, wherein the detachable cap is attached to the head plate with a pressure resistant sealant.

5. The CCU of claim 1, wherein the detachable cap comprises a hose to vent any leaked working fluid or gas to atmosphere via a duct.

6. The CCU of claim 1, wherein the detachable cap is comprised of sheet metal or plastic.

* * * * *